3,035,041
Patented May 15, 1962

3,035,041
METHOD OF PREPARING AMIDES
Robert Schwyzer, Beat Iselin, and Max Feurer, Riehen, Switzerland, assignors to Ciba Corporation, a corporation of Delaware
No Drawing. Filed Oct. 19, 1956, Ser. No. 616,923
Claims priority, application Switzerland Feb. 9, 1954
7 Claims. (Cl. 260—112)

This a continuation-in-part of U.S. application Serial No. 485,818, filed February 2, 1955, and now abandoned.

This invention relates to a new method of organic synthesis. More particularly this invention concerns a new method of preparing amides, i.e. monoamides and polyamides such as peptides and proteins.

The search for desirable synthetic processes for the preparation of amides has become extremely vigorous in recent years. Degradation studies on naturally occuring proteins and polypeptides have stimulated research looking toward synthetic duplication of natural substances through condensation of chemical components by means of simple, inexpensive processes leading to physiologically active compounds.

Many methods are known for the condensation of amino acids and peptides. For example, in the condensation of α-aminocarboxylic acids, it is generally the practice to protect the labile amino group with an appropriate protecting function such as carbobenzoxy group, convert the carboxyl radical to an acid anhydride or acid chloride then, if desired, hydrolyze the protecting group before condensation. The primary disadvantage of this method is that these derivatives are generally unstable and difficult to handle. The acid chlorides decompose easily whereas the anhydrides are difficult to isolate and tend to racemize. Furthermore, if it is desired to react an aminocarboxylic acid with a unprotected amino group, the removal of N-protecting groups is different since the usual hydrolyzing agents also attack the functionally converted carboxyl radical.

Another known method of amide synthesis is to esterify the carboxyl group of the acid preparatory to condensation with the amine. However, the low reactivity of the esters necessitates the use of high temperatures to effect condensation with the amine. This requirement places a limitation on the range of starting materials which may be used, since many acids, particularly amino-acids, are sensitive to heat. Thus, the tendency toward decomposition of the acid chlorides, the difficulty of isolation of the anhydrides and the unreactivity of the esters lead toward unsatisfactory yields of polyamides, particularly where it is desired to prepare cyclic peptides.

We have now discovered an improved method for preparing acid amides which overcomes the above-mentioned difficulties and provides a simple, quick means for their preparation. According to the new process of this invention an ester of a carboxylic acid, especially of an amino acid, is reacted with an amino group having an amine hydrogen. A carboxylic acid ester, in accordance with this invention, may be defined as one which contains in the alcohol component one of the following substituents:

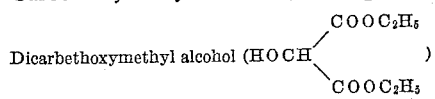
(a)  (b)  (c)  (d)

Advantageously, the said substituent is separated from from the oxygen of the ester group by a hydrocarbon chain of at least one carbon atom, preferably by 1 to 6 carbon atoms. Of particular suitability are esters of the following alcohols:

Cyanomethyl alcohol (HOCH$_2$CN)
Hydroxyacetone (HOCH$_2$COCH$_3$)
Carbethoxymethyl alcohol (HOCH$_2$COOC$_2$H$_5$)

Dicarbethoxymethyl alcohol (HOCH$\begin{smallmatrix}\diagup COOC_2H_5 \\ \diagdown COOC_2H_5\end{smallmatrix}$)

p-Nitrophenylmethyl-alcohol (HOCH$_2$C$_6$H$_4$NO$_2$)
p-Nitrophenol (HOC$_6$N$_4$NO$_2$)
p-Methanesulfonyl-phenol (HOC$_6$H$_4$SO$_2$CH$_3$)

The aminocarboxylic acid esters used as starting materials which contain as activating substituents a cyano, oxo or two esterified carboxyl groups are new. Also new are esters of aminocarboxylic acids substituted in the α-position by organic radicals, with alcohols which contain as activating substituents a free or esterified carboxyl or nitro group. These esters may be prepared by reacting a carboxylic acid with a hydrohalic ester of the corresponding alcohol for example chloracetonitrile, in the presence of a tertiary organic base such as triethylamine. The reaction is conducted either without solvent or in the presence of an organic solvent, such as ethyl acetate, dioxane, dimethyl formamide, acetonitrile or mixtures thereof.

A principal feature of the new method may be more clearly illustrated by the following general equation:

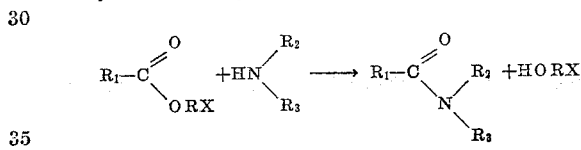

wherein

represents a radical derived from a carboxylic acid, especially an amino-carboxylic acid having the suitably blocked amino group or groups, R$_2$ represents hydrogen or an organic radical attached to an amino group by a carbon to nitrogen linkage, R$_3$ represents a radical attached to an amino group by a carbon to nitrogen linkage and X is one of (a), (b), (c) or (d), above, separated from the ester oxygen by R which represents one or more carbon atoms, preferably from 1 to 6 carbon atoms. More specifically, R$_1$ represents an organic radical attached to the carbonyl group by a carbon to carbon linkage, belonging to the aliphatic, alicyclic aromatic, araliphatic or heterocyclic series and having, preferably, an amino substituent containing an acyl, acylaminoacyl, aminoacyl-aminoacyl, alkyl, alkylene, cycloalkyl, aryl, aralkyl or heterocyclic residue.

It will be seen from the above formulae that the process of this invention is widely applicable either to carboxylic or to aminocarboxylic acids and it is intended that processes comprising the use of either of these broad classes of starting materials be included in the scope of this invention. Advantageously, the process is particularly suitable for the condensation of amino acids and peptides, especially those having at least one carbon atom separating the amino and carbonyl groups.

Any primary or secondary amine may be used in the new process of this invention. Among those which may be employed in the new process are the following: primary aliphatic amines such as methylamine, ethylamine, propylamine, butylamine, hexylamine, and allylamine; secondary aliphatic amines such as dimethylamine, diethylamine, dipropylamine and dibutylamine; substituted aliphatic amines such as chloroethylamine, phenethylamine and benzylamine; aromatic amines such as aniline and naphthylamine; substituted aromatic amines such as m-toluidine and p-benzylaniline; secondary mixed aliphatic aromatic amines such as N-allylaniline and benzylaniline; cyclic amines such as a secondary piperidine, diamines such as butylenediamine and ethylenediamine and heterocyclic amines such as amino pyridines and amino piperidines.

A variety of other amines are equally suitable for use in the present invention, the sole requirement being that the compound have an amino group having an amine hydrogen. Thus, another amino acid or a peptide may be used in the reaction with the object of preparing a peptide or polypeptide.

A particular modification of the new process of this invention and one which is intended to be included within the scope of this application is the employment of starting materials and conditions which favor the formation of cyclic and linear peptides from starting materials containing the above-mentioned esterified carboxyl group and an amino group having an amine hydrogen in the same molecule. Thus, where the amino acid employed as a starting material is one where the free amino group is separated from the ester carbonyl group by at least two carbon atoms, preferably 2 to 9 carbon atoms, or by one or more acylamino residues, the free amino group of the amino acid starting material can be caused to condense with the esterified carboxyl group of the same amino acid. In other words, the amino acid itself will furnish the amino group for the condensation reaction. In this case it is advantageous to employ the starting material in the form of a salt and to conduct the reaction under basic conditions to ensure the availability of a free amino group. As alkaline agents for this purpose there may be employed inorganic bases such as alkali hydroxides or carbonate for example, those of sodium, potassium or ammonium. Organic bases, preferably tertiary amines e.g. pyridine may also be used.

In this modification of our process i.e. where the aminocarboxylic acid itself is to furnish the amino group, the starting material is as said above advantageously employed in the form of a salt. Its preparation is accomplished, for example, by reaction of an N-triphenylmethyl-aminocarboxylic acid with a hydrogen halide ester of the corresponding alcohol in the presence of a tertiary organic base with subsequent splitting off of the triphenylmethyl residue by treatment with dilute acid. Salts suitable for use in the new reaction of this invention include those of hydrogen halide acids such as hydrochloric acid, mineral acids such as phosphoric acid and sulfuric acid, or halogenated fatty acids such as trifluoracetic acid.

When the starting material i.e. amino carboxylic acid or peptide, is used in the form of its basic salt, its concentration in the basic solvent will determine the relative amounts of linear and cyclic products obtained. If a relatively high concentration is used, a major portion of the reaction product will be a linear polyamide. Conversely, if a low concentration of starting material is used, a higher yield of cyclic polyamide will result. The exact concentration to be employed is a matter of choice for one skilled in the art and depends largely upon what type of product is desired and the nature of the starting materials, solvents etc. used. In general, it may be stated that the Thope-Ziegler rule for cyclization reactions can serve as a guide for determining aptural conditions for obtaining highest yields of a desired product [Ber., 67A (1934)]. Thus, reactions carried out at high dilution favor intramolecular reaction over intermolecular reaction and result in cyclization. On the other hand, reactions carried out at high concentration favor intermolecular reaction and result in the formation of predominant quantities of linear product. By way of further explanation it may be stated that low concentrations favor cyclization because smaller numbers of molecules of starting material having an esterified carboxyl group tend to attract the free amino group of the same molecule, whereas larger concentrations of these respective groups tend to attract different molecules, and hence form linear compounds. The practivity of molecules to cyclize or to linearize as reflected by their concentration in a given volume of solvent is a matter within the knowledge of the skilled organic chemist. Accordingly, some judgment must be exercised under a given set of correlation if one desires, as the ultimate product, either a linear or a cyclic polyamide. It is to be understood that a wide latitude is available with respect to the selection of starting materials, solvents, reaction conditions, etc. small changes in any of these variables reflecting a corresponding difference in the character and quantity of final product obtained.

The new process is particular advantageous for the preparation of complex high molecular polypeptides which heretofore it has not been possible to prepare by known methods. A notable illustration of this is the preparation of Gramicidin S whose synthesis is set forth in detail below. The following amino acids, their amides and salts may be used in the new process of this invention: alanine, aspartic acid, histidine, asparagine, proline, tryptophane, hydroxyproline, valine, norvaline, leucine, norleucine, isoleucine, isovaline, phenylalanine, tyrosine, serine, cysteine, methionine, glutamic acid, lysine and ornithine.

Any amino groups present in the starting material not intended for taking part in the condensation reaction may be suitably protected, for example, by a carbobenzoxy or tosyl radical. After formation of the polyamide, the protecting groups can be split off by methods known to those skilled in the art, as for example by hydrolysis.

The new reaction may advantageous by performed without a solvent or, preferably, in the presence of an inert organic solvent such as ethyl acetate, dioxane, dimethylformamide or acetonitrile, if desired, in the presence of water. Other solvents which may be mentioned as suitable for use in the new process are the chlorinated hydrocarbons such as carbon tetrachloride, chlorobenzene and chloroform, aliphatic ethers such as methyl ether and ethyl ether, and aromatic hydrocarbons such as toluene and xylene.

In some cases, for example when the reaction is carried out with aromatic amines, the yield of amide can be further increased by the addition of a basic or acid catalyst such as triethylamine, glacial acetic acid or sulfuric acid.

The examples set forth below are given for the purpose of illustrating, but not limiting, the scope of the present inventions.

*Example 1*

1.75 grams of phenylacetic acid cyanomethyl ester and 1.2 grams of benzylamine are dissolved in 5 cc. of ethyl acetate and allowed to stand for 4 hours at room temperature. After only a few minutes the phenylacetic acid benzylamine begins to separate off in the form of colorless crystals. The crystals are filtered with suction and washed with a little ethyl acetate. The yield amounts to 1.32 grams, melting point=120–121° C. From the mother liquor a further 290 mg. melting at 120° C. can be isolated. Total yield is 1.61 grams (71.5%).

The phenylacetic acid cyanomethyl ester used as starting material can be prepared as follows:

5.44 grams of phenylacetic acid, 6.06 grams of triethylamine and 7.55 grams of chloracetonitrile (molecular proportions: 1:1.5:2.5) are mixed together and heated for ½ hour at 70° C. Any excess chloracetonitrile is then distilled off in vacuo, and the residue taken up with ether and 2 N-hydrochloric acid. The organic layer is separated off and washed with ice-cold sodium bicarbonate solution and water, dried over sodium sulfate and freed from solvent by distillation. Residue=7.16 grams of oil. The substance is distilled in a bulb tube:

(1) B.P. 140–145° C. (bath temperature) under 12 mm. of pressure: 310 mg. oil.
(2) B.P. 156–160° C. (bath temperature) under 12 mm. of pressure: 6.4 grams (=91% of colorless oil).

Fraction 2 is distilled once more under the same conditions and yields analytically pure phenylacetic acid cyanomethyl ester.

*Example 2*

3.24 grams of stearic acid cyanomethyl ester and 1.2 grams of benzylamine are dissolved in 10 cc. of ethyl acetate with heating and allowed to stand for 2 hours at 45° C. The stearic acid benzylamide soon begins to crystallize out. By filtration 2.53 grams (68%) of stearic acid benzylamide are obtained melting at 97–98° C. From the mother liquor another 850 mg. (23%) of stearic acid benzylamide can be recovered. The total yield of amide thus amounts to 91%.

The stearic acid cyanomethyl ester used as starting material can be prepared as follows:

4.66 grams of stearic acid, 2.49 grams of triethylamine and 3.11 grams of chloracetonitrile (molecular proportions 1:1.5:2.5) are mixed and heated for ½ hour at 70° C., whereby the product begins to crystallize out. The excess of chloracetonitrile is distilled off in vacuo and the residue worked up in the manner described in Example 1. The crude product (5.33 grams) is recrystallized from a mixture of acetone and water, 5.11 grams (96%) of stearic acid cyanomethyl ester melting at 55–56.5° C. being obtained. After recrystallizing twice from a mixture of acetone and water the substance melts at 56–57.5° C.

*Example 3*

1.6 grams (0.01 mol) of benzoic acid cyanomethyl ester and 1.2 grams (0.011 mol) of benzylamine are dissolved in 5 cc. of ethyl acetate and allowed to stand for 20 hours at room temperature. Already after 2 hours crystals of the relatively easily soluble benzoic acid benzylamide begin to separate. The crystals are separated off and the mother liquor washed with dilute hydrochloric acid, sodium bicarbonate solution and water, dried and evaporated. The residue crystallizes spontaneously and is recrystallized from a mixture of ether and petroleum ether. Yield amounts to 1.47 grams (70%), elongated crystal leaflets melting at 106–107° C. (in the literature 105–106° C.).

The starting material can be prepared as follows:

6.1 grams of benzoic acid are dissolved in 50 cc. of ethyl acetate and 7.6 grams of triethylamine, and mixed with 5.6 grams of chloracetonitrile and then maintained under reflux for 3 hours. The reaction mixture is cooled, diluted with ethyl acetate and the organic solution washed with dilute sodium bicarbonate solution and water, dried and the ethyl acetate distilled off under normal pressure. The residue is distilled in vacuo and yields 6.0 grams (74.4%) of pure benzoic acid cyanomethyl ester boiling at 144° C. under 12 mm. of pressure.

*Example 4*

2.51 grams of 3,4,5-trimethoxy-benzoic acid cyanomethyl ester and 1.2 grams of benzylamine are dissolved in 2 cc. of chloroform and allowed to stand for 20 hours at 45° C. After addition of 5 cc. of ethyl acetate 1.28 grams (42.5%) of crystalline 3,4,5-trimethoxy-benzoic acid benzylamide melting at 137–138° C. is obtained.

The 3,4,5-trimethoxy-benzoic acid cyanomethyl ester used as starting material is prepared as follows:

10.6 grams of 3,4,5-trimethoxy-benzoic acid, 7.58 grams of triethylamine and 9.45 grams of chloracetonitrile are reacted together as described in Example 1. A yield of 11.98 grams (95.5%) of trimethoxy-benzoic acid cyanomethyl ester is obtained melting at 112–113° C. (from ethyl acetate and petroleum ether).

*Example 5*

1.77 grams of salicylic acid cyanomethyl ester and 1.2 grams of benzylamine are allowed to stand in 5 cc. of ethyl acetate for 18 hours at 45° C. The clear solution is then washed with 2 N-hydrochloric acid, dilute sodium bicarbonate solution and water, dried and freed from the solvent in vacuo. The crystalline residue is recrystallized from a mixture of benzene and petroleum ether. There are obtained 2.0 grams (88%) of salicyclic acid benzylamide melting at 132–133° C.

The starting material is prepared as follows: 6.9 grams of salicylic acid, 7.58 grams of triethylamine and 9.45 grams of chloracetonitrile are reacted in the manner described in Example 1. The salicylic acid cyanomethyl ester (yield 7.74 grams=87.5%) crystallizes from a mixture of ether and petroleum ether in the form of small, colorless needles melting at 68–69° C.

*Example 6*

810 mg. of isonicotinic acid cyanomethyl ester and 600 mg. of benzylamine are dissolved in 2.5 cc. of ethyl acetate and allowed to stand for 18 hours at 45° C. After the addition of more ethyl acetate the solution is washed with dilute sodium bicarbonate solution and water, dried and freed from the solvent in vacuo. Long colorless crystal needles of isonicotinic acid benzylamide are obtained from a mixture of benzene and petroleum ether in a yield of 640 mg. (60%) melting at 92–93° C.

The starting material can be prepared as follows:

6.15 grams of isonicotinic acid, 7.58 grams of triethylamine and 9.45 grams of chloracetonitrile (molecular proportions 1:1.5:2.5) are heated together for half an hour at 70° C. The excess chloracetonitrile is distilled off in vacuo and the residue taken up in ether and water. The ethereal layer is washed several times with water, dried over sodium sulfate and freed from the solvent under reduced pressure. The residue is dissolved in benzene and filtered through 24 grams of neutral aluminum oxide. From the eluates there can be obtained 1.98 grams (24.5%) of crystalline isonicotinic acid cyanomethyl ester melting at 71–72° C. by crystallization from petroleum ether. By using the same amount of triethylamine as chloracetonitrile 42% are obtained.

*Example 7*

810 mg. of nicotinic acid cyanomethyl ester and 600 mg. of benzylamine are dissolved in 2.5 cc. of ethyl acetate and allowed to stand for 18 hours at 45° C. Working up is carried on as described in Example 6. The resulting sirup is crystallized from ether yielding 660 mg. (62%) of nicotinic acid benzylamide of M.P. 82–83° C.

The nicotinic acid cyanomethyl ester used as starting material can be prepared as follows:

From 6.15 grams of nicotinic acid, 7.58 grams of triethylamine and 9.45 grams of chloracetonitrile there are obtained in the same manner as described in Example 6, 2.35 grams (29%) of nicotinic acid cyanomethyl ester boiling at 165–169° C. (bath temperature) under 12 mm. of pressure. Under 0.06 mm. of pressure the substance distils at 92° C. (bath temperature).

*Example 8*

1.09 gram of hippuric acid cyanomethyl ester (0.005 mol) and 0.53 gram benzylamine (0.005 mol) are dissolved in 10 cc. of ethyl acetate and allowed to stand at 24° C. After only five minutes crystallization commences. After thirty minutes, the separated amide is filtered off. The yield amounts to 1.1 gram (82%). After recrystallization from alcohol, the hippuric acid benzylamide melts at 157–158° C. If the same ingredients are used with double the quantity of benzylamine, the yield rises to 96% (calculated upon the ester). If instead of ethyl acetate the following solvents are used, the yields fall as shown:

Ethanol _____ Yield 60%
Ethanol-water 1:1_____ Yield 56%
Dimethylformamide-water 2:3_____ Yield 74%

The reaction may be illustrated by the following scheme:

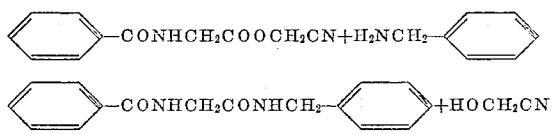

By starting from hippuric acid cyanomethyl ester and the corresponding amines, there are obtained in an analogous manner:

Hippuric acid cyclohexylamide of M.P. 161–162° C. in a yield of 91%.

Hippuric acid isopropylamide of M.P. 185–186° C. in a yield of 95%.

Under analogous conditions hippuric acid methyl ester, when reacted with an equimolecular quantity of benzylamine, shows a yield of 3% hippuric acid benzylamide after 48 hours and 16% after 260 hours.

The hippuric acid cyanomethyl ester used as starting material can be prepared as follows:

A solution of 3.58 grams of hippuric acid (0.02 mol) and 3.03 grams of triethylamine (0.03 mol) in 30 cc. of ethyl acetate is treated with 2.27 grams of chloracetonitrile (0.03 mol) and the whole maintained under reflux for three hours. The reaction mixture is cooled, the separated triethylamine hydrochloride isolated and the ethyl acetate solution washed with dilute sodium bicarbonate solution and water, dried and evaporated. The residue crystallizes on addition of ether and gives 3.47 grams (80%) of hippuric acid cyanomethyl ester of M.P. 97–99° C. By recrystallization from acetone-ether, the M.P. raised to 99–100° C.

By the application of other solvents under otherwise similar reaction conditions, the following yields are obtained:

Acetone _____ Yield 83%
Benzene _____ Yield 80%
Acetonitrile _____ Yield 76%
Dimethylformamide _____ Yield 75%

The formation of the ester proceeds according to the following scheme:

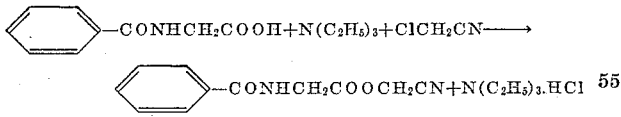

Example 9

2.18 grams of hippuric acid cyanomethyl ester (0.01 mol) are dissolved in 20 cc. of ethyl acetate and treated with 2.06 grams (0.02 mol) of freshly distilled glycine ethyl ester. The reaction solution is allowed to stand for 2½ hours at room temperature, then washed with water, dried with sodium sulfate and evaporated under vacuum. The residue crystallizes on addition of ether. The resulting benzoylglycyl glycine ethel ester of the formula:

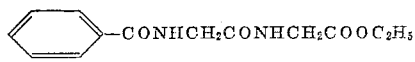

melts at 116–117° C. after recrystallization from water. The yield amounts to 2.4 grams (= 94%).

Example 10

1.09 grams of hippuric acid cyanomethyl ester (0.005 mol) are dissolved in 2 cc. of dimethylformamide and treated with a solution of 0.38 gram of glycine (0.005 mol) and 0.5 gram of triethylamine in 3 cc. of water, whereby the ester separates partially as an oil. The reaction mixture is mechanically shaken for 8 hours at 24° C. until a clear solution is produced, thereupon evaporated under vacuum and the residue taken up in 2 N-hydrochloric acid. On cooling, the reaction product separates in crystalline form. The hippuric acid contained as impurity in the crude product, is removed by extraction with hot ethyl acetate and the residue remaining is recrystallized from water. The resulting benzoylglycylglycine melts at 205–207° C. Yield 0.83 gram (=70%).

Example 11

A solution of 1.09 grams of hippuric acid cyanomethyl ester and 1.66 grams of aniline in 10 cc. of ethyl acetate is heated for 5 hours under reflux and then left for some time at 0° C. The separated crystallizate is isolated (0.18 gram=14%) and recrystallized from alcohol. The hippuric acid anilide obtained melts at 211–212° C.

By adding 0.5 gram of triethylamine as catalyst the yield amounts to 0.60 gram (48%); and by extending the reaction time to 24 hours the yield is increased to 0.80 gram (63%).

The reaction can also be carried out in the absence of a solvent in the following manner: 1.09 grams of hippuric acid cyanomethyl ester and 5 cc. of aniline are heated for 5 hours at 90° C. The excess aniline is then removed in vacuo and the hippuric acid anilide formed is crystallized from ethyl acetate. The yield amounts to 0.74 gram (58%) in this case.

By the addition of 1 drop of concentrated sulfuric acid the yield is increased to 0.99 gram (80%) and by the addition of 1 drop of glacial acetic acid to 1.22 grams (96%).

Example 12

1.33 grams of hippuric acid carbethoxymethyl ester are dissolved in 10 cc. of ethyl acetate and treated with 1.16 grams of benzylamine. After 10 minutes, the separation of crystals commences. The reaction mixture is allowed to stand for 1 hour at room temperature and thereupon the separated amide is filtered off. 1.34 grams (100%) of crystalline material of M.P. 157–158° C. are obtained which is identical with the hippuric acid benzylamide obtained according to Example 8.

The reaction may be illustrated by the following scheme:

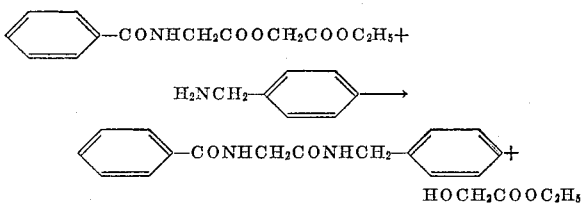

The hippuric acid carbethoxymethyl ester is obtained by a method analogous to that described in Example 8 by reaction of hippuric acid with bromacetic acid ethyl ester. The ester recrystallized from acetone-ether melts at 70–71° C. Yield 82%.

Example 13

A solution of 0.67 gram of hippuric acid dicarbethoxymethyl ester (0.002 mol) and 0.24 gram of benzylamine (0.0022 mol) in 5 cc. of ethyl acetate is allowed to stand for one hour at room temperature. The separated crystalline material melting at 157–158° C. is identical with the hippuric acid benzylamide described in Example 8. Yield 0.34 gram (63%).

The reaction proceeds according to the following scheme:

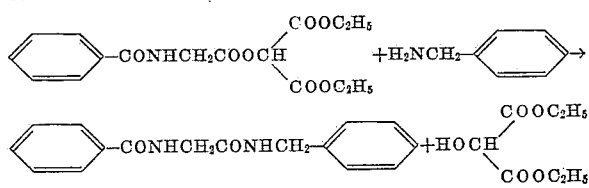

The ester used as starting material can be prepared as follows:

3.58 grams of hippuric acid (0.02 mol) and 2.02 grams of triethylamine (0.02 mol) are dissolved in 5 cc. of ethyl acetate and heated under reflux. To the boiling solution are added dropwise 4.78 grams of bromomalonic acid diethyl ester (0.02 mol) dissolved in 5 cc. of ethyl acetate within 90 minutes; the reaction mixture is maintained for a further 90 minutes under reflux and then worked up in the manner described in Example 1. The oily residue is distilled under 0.05 mm. pressure, the main quantity (4.72 grams=70%) passing over at 185–200° C. Further distillation yields 4.30 grams (64%) of pure hippuric acid dicarbethoxy methylester boiling at 190–193° C. under 0.02 mm. of pressure.

*Example 14*

A solution of 1.33 grams of carbobenzoxy-glycine carbamidomethyl ester and 5.36 grams of benzylamine in 20 cc. of ethyl acetate is allowed to stand for 50 hours at room temperature and then heated for 3 hours at 60° C. The reaction solution is then evaporated under reduced pressure and the residue crystallized from ether, 1.28 grams (86%) of carbobenzoxy-glycine benzylamide of the formula

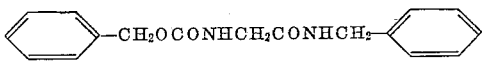

being obtained. After recrystallization from alcohol the compound melts at 113–114° C.

The ester used as starting material can be prepared as follows:

4.18 grams of carbobenzoxy-glycine (0.02 mol) are dissolved in a mixture of 15 cc. of dioxane and 10 cc. of ethyl acetate with heating, mixed with 2.81 grams of chloracetamide (0.03 mol) and 5.6 cc. of triethylamine (0.04 mol), and boiled under reflux for 3 hours. The mixture is evaporated to dryness in vacuo, the residue is taken up in ethyl acetate and the solution washed with semi-saturated caustic soda solution and water. After drying, the solvent is evaporated in vacuo, and the residue is recrystallized from a mixture of methylene chloride and petroleum ether. Yield=2.7 grams (50.8%). The carbobenzoxy-glycine carbamidomethyl ester melts at 100–102° C.

*Example 15*

A solution of 1.18 grams of hippuric acid acetonyl ester and 1.07 grams of benzylamine in 10 cc. of ethyl acetate is allowed to stand for 20 hours at room temperature. The separated crystalline material (0.70 gram= 52%) is identical with the hippuric acid benzlyamide of M.P. 157–158° C. described in Example 8.

The reaction proceeds according to the following scheme:

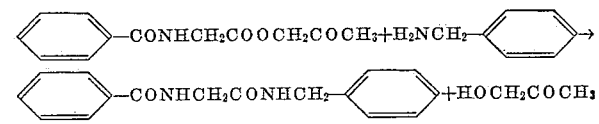

The hippuric acid acetonyl ester used as starting material is prepared as follows:

3.58 grams of hippuric acid and 3.03 grams of triethylamine are dissolved in 30 cc. of ethyl acetate and treated with 3.7 grams of chloracetone. The solution is heated for 5 hours under reflux and thereupon worked up in the manner described in Example 8 whereby 3.04 grams (65%) of crystalline ester of M.P. 90–92° C. are obtained. After recrystallization twice from alcohol, the M.P. is 93–94° C.

*Example 16*

A suspension of 1.57 grams of hippuric acid-p-nitrophenyl-methyl ester in 10 cc. of ethyl acetate is treated with 1.07 grams of benzylamine and the whole maintained under reflux for 5 hours. The starting material thereby passes into solution and a new product is deposited which, after cooling of the reaction mixture, is filtered off. The material of M.P. 157–158° C., obtained in the yield of 1.10 grams (=82%), is identical with the hippuric acid benzylamide described in Example 8.

The hippuric acid p-nitrophenyl-methyl ester is obtained by a method analogous to that described in Example 8 by reaction of hippuric acid with p-nitrobenzyl chloride, in this case however more prolonged heating (15 hours) is advantageous. The ester recrystallized from alcohol melts at 134–135° C. Yield 82%.

The starting material can be obtained by the method described in Example 8 by reaction of hippuric acid with chloromethyl ether. The hippuric acid methoxymethyl ester of boiling point 136–138° C. under 0.01 mm. pressure is obtained in yield of 67%.

*Example 17*

1.24 grams of carbobenzoxy-glycine cyanomethyl ester (0.005 mol) are dissolved in 10 cc. of ethyl acetate and treated with 0.53 gram of benzylamine (0.005 mol). After 10 minutes, the separation of crystals commences which are filtered off after 30 minutes. The material obtained in a yield of 1.20 grams (=30%) melting at 113–114° C. is identical with the carbobenzoxy-glycine benzyl amide described in Example 14.

In a similar manner, from the phthalyl-glycine cyanomethyl ester the phthalyl-glycine benzylamide of M.P. 209–210° C. is produced in 88% yield and from the tosylglycine cyanomethyl ester the tosyl-glycine-benzylamide, M.P. 114–115° C., in 92% yield.

The esters used as starting materials are prepared by the method described in Example 8 by reaction of the glycine correspondingly substituted on the nitrogen with chloracetonitrile:

Carbobenzoxy - glycine - cyanomethylester, M.P. 64–65° C.—Yield 83%.
Phthalyl - glycine - cyanomethyl ester, M.P. 121–130° C.—Yield 76%.
Tosyl-glycine-cyanomethyl ester, M.P. 82–83° C.—Yield 81%.

In the preparation of the last named ester, a longer duration of the heating (5 hours) is necessary.

*Example 18*

2.49 grams of carbobenzoxy-glycine cyanomethyl ester (0.01 mol) and 0.36 gram of ethylene diamine (0.006 mol) are dissolved in 17 cc. of ethyl acetate, whereupon the diamide begins to separate immediately. After 23 hours at 20° C. the reaction product is isolated and recrystallized from acetone. The N:N'-dicarbobenzoxy-glycyl ethylene diamine melts at 202–203° C. Yield= 1.57 grams (71%).

*Example 19*

A solution of 12.9 grams of phthalyl-β-alanine cyanomethyl ester (0.05 mol) and 10.2 grams of piperidine (0.12 mol) in 70 cc. of ethyl acetate is allowed to stand for 3 hours at 60° C. and then for 15 hours at room temperature. The reaction mixture is thereupon evaporated under vacuum and the crystalline residue recrystallized from methylene chloride-petroleum ether. The phthalyl-β-alanine piperidine melts at 137–138° C. Yield 12.2 grams (=85%).

In an analogous manner, the phthalyl-β-alanine carbethoxy methyl ester can be reacted with piperidine, in this case a longer reaction period being necessary (5 hours at 60° C.).

The phthalyl-β-alanine-cyanomethyl ester used as starting material is prepared by a method analogous to that described in Example 8 by esterification of phthalyl-β-alanine with chloracetonitrile. After recrystallization from benzene-ligroin it melts at 97–97.5° C. Yield 85%. The phthalyl-β-alanine carbethoxy methyl ester can likewise be prepared by a method analogous to that described in Example 8 by esterification of phthalyl-β-alanine with ethyl bromacetate, it melts at 91–92° C. Yield 96%.

*Example 20*

110 mg. of glycyl-glycine hydrochloride ($0.65 \times 10^{-3}$ mol) are dissolved in 0.2 cc. of hot water and treated with 0.2 cc. of triethylamine ($1.4 \times 10^{-3}$ mol). The solution is then diluted with 0.5 cc. of acetonitrile and 160 mg. of carbobenzoxy-glycine cyanomethyl ester ($0.65 \times 10^{-3}$ mol) added. After 1 hour at 60° C., the solvent is evaporated under vacuum and the residue taken up in 1 cc. of 2 N-hydrochloric acid. On cooling with ice, the reaction product separates in the form of colorless crystals. The substance is dried and washed with absolute alcohol. Yield 200 mg. (=96%), M.P. 194–195° C., unchanges in admixture with authentic carbobenzoxy-triglycine (M.P. 196–197° C.).

The carbobenzoxy glycine cyanomethyl ester used as starting material is described in Example 17.

*Example 21*

$0.6 \times 10^{-3}$ mol of carbobenzoxy-glycine-carbethoxymethyl ester is reacted with glycyl hydrochloride under the conditions set forth in Example 20. The carbobenzoxy triglycine is thereby produced in about 40% yield.

The carbobenzoxy-glycine-carbethoxymethyl ester of the formula

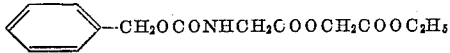

is prepared as follows:

2.09 grams of carbobenzoxy-glycine ($1 \times 10^{-2}$ mol) together with 1.1 grams of triethylamine ($1.09 \times 10^{-2}$ mol) are dissolved in 10 cc. of ethyl acetate and treated with 1.85 grams of ethel bromacetate ($1.1 \times 10^{-2}$ mol). The separation of triethyl ammonium bromide commences immediately at room temperature. After 1 hour, for completion of the reaction, the whole is heated for a further hour to boiling temperature and, after cooling, the triethylamine salt separated and washed with ethyl acetate and ether. In this manner 1.75 grams of the salt are isolated, which is 100% of the theoretical quantity. The ethyl acetate solution is then washed with dilute sodium bicarbonate solution and water. After drying and evaporation of the solvent, 2.9 grams remain of an oil which soon crystallizes (yield of crude material 98%), which oil is triturated with petroleum ether. The resulting needle shaped crystals melt at 44–45° C., the melting point cannot be raised by further crystallization from ether-petroleum ether.

*Example 22*

By a method analogous to that described in Example 20, 445 mg. of carbobenzoxy glycine cyanomethyl ester ($2 \times 10^{-3}$ mol) and 267 mg. of DL-methionine ($2 \times 10^{-3}$ mol) are reacted together. In this manner the carbobenzoxy glycyl DL-methionine is produced of the formula

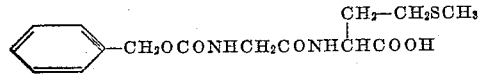

in 86% yield.

After recrystallization from ethyl acetate-petroleum ether, the amide melts at 121–123° C.

*Example 23*

50 mg. of carbobenzoxy-glycyl-DL-alanyl-glycine-cyanomethyl ester ($1.33 \times 10^{-4}$ mol) are introduced into a solution of 30 mg. of glycine methyl ester hydrochloride $2.4 \times 10^{-4}$ mol) in 0.5 cc. of acetonitrile and 3 drops of triethylamine. After 20 hours at 20° C., the solvent is evaporated and the residue recrystallized from hot water (after acidification with dilute hydrochloric acid). The carbobenzoxy-glycyl-DL-alanyl-glycyl-glycine methyl ester is recrystallized from 1.5 cc. of methanol. Colorless microscopic crystal needles which are practically insoluble in boiling acetone. Yield 50 mg. (=92%). M.P.=144–145° C.

The ester used as starting material is prepared as follows:

0.44 gram of carbobenzoxy-glycyl-DL-alanyl-glycine ($1.3 \times 10^{-3}$ mol) and 0.2 gram of triethylamine ($2 \times 10^{-3}$ mol) are dissolved in 1 cc. of chloracetonitrile and the whole heated for ½ hour to 80° C. Thereupon the solvent is distilled off under vacuum and the residue taken up in ethyl acetate and washed with sodium bicarbonate solution and water. Drying and evaporation of the solvent produce 490 mg. of crystalline ester. When crystallized from acetone, the carbobenzoxy-glycyl-DL-alanyl-glycine cyanomethyl ester is obtained in the form of colorless crystals which melt at 145–145.5° C. Yield 470 mg. (=95%).

*Example 24*

1.87 grams of p-nitrobenzoyl-L-glutamic acid dicyanomethyl ester (0.005 mol) are dissolved in 30 cc. of absolute ethyl acetate, 5.36 grams of benzylamine (0.05 mol) added and the mixture maintained for 17 hours at room temperature. After one hour the reaction product commences to deposit. The mixture is evaporated under vacuum to dryness and the crystalline residue recrystallized from dimethyl formamide-acetronitrile. Yield: 89%. The p-nitrobenzoyl-L-glutamic acid dibenzylamide of the formula

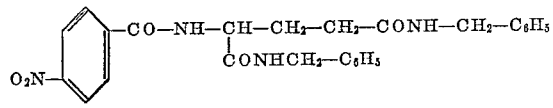

melts at 219–220° C.

In a similar manner the following esters may be reacted with benzylamine:

Dicarbobenzoxy-L-cystine dicyanomethyl ester
Dicarbobenzoxy-L-cystine dicarbethoxymethyl ester
Carbobenzoxy-L-asparagine cyanomethyl ester
Carbobenzoxy-L-asparagine carbethoxymethyl ester
N-tosyl-L-pyrrolidone-2-carboxylic acid cyanomethyl ester
5-benzyloxy-indolyl-3-acetic acid cyanomethyl ester
5-benzyloxy-indole-2-carboxylic acid carbethoxymethyl ester.

The cyanomethyl esters used as starting materials may be prepared as follows:

2.96 grams of p-nitrobenzoyl-L-glutamic acid (0.01 mol) are dissolved with heating in 22.6 grams (0.3 mol) of chloracetonitrile and 3.0 grams (0.03 mol) of triethylamine and the solution heated for 2 hours to 80° C. The reaction mixture is then evaporated under vacuum to dryness, the crystalline residue taken up in ethyl acetate and the organic layer washed with water and semi-saturated sodium carbonate solution, dried and evaporated. The crystalline residue, when recrystallized from acetone-petroleum ether, yields 2.77 grams (=74%) of p-nitrobenzoyl-L-glutamic acid dicyanomethyl ester. M.P.=102–102.5° C.

The following are prepared in a similar manner:

Dicarbobenzoxy-L-cystine dicyanomethyl ester, M.P. 93–93.5° C.
Carbobenzoxy - L - asparagine cyanomethyl ester, M.P. 128–129° C.

5-benzyloxy-indolyl-3-acetic acid cyanomethyl esters, M.P. 91–92° C.

The carbethoxymethyl esters used as starting materials:
Dicarbobenzoxy - L - cystine dicarbethoxymethyl ester, M.P.=105.5–106° C.
Carbobenzoxy - L - asparagine carbethoxymethyl ester, M.P.=112–113° C.
5-benzyloxy - indole-2-carboxylic acid carbethoxymethyl ester M.P.=148–149° C.
are prepared by the method given in Example 21.

The N-tosyl-L-pyrrolidone-2-carboxylic acid cyanomethyl ester can be prepared as follows:

8.49 grams of N-tosyl-L-pyrrolidone-2-carboxylic acid (0.03 mol), 2.85 cc. of chloroacetonitrile (0.045 mol) and 6.33 cc. of triethylamine (0.045 mol) are dissolved in 100 cc. of ethyl acetate and heated for 8 hours under reflux. After working up in the usual manner a crystalline residue is obtained which after recrystallization from benzene yields 7.96 grams (82%) ester melting at 139–140° C, $[\alpha]_D^{22}$= −26° (c.=1 in acetone).

*Example 25*

A solution of 1.02 grams of tosyl-glutamine cyanomethyl ester and 0.62 gram of glycine ethyl ester in 15 cc. of ethyl acetate is heated for 2¼ hours under reflux. The solvent is then distilled off under reduced pressure, and the crystalline residue recrystallized from acetonitrile and ethyl acetate. Yield=0.80 gram (72%). The tosyl-glutaminyl-glycine ethyl ester of the formula

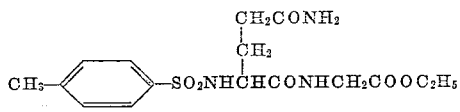

melts at 169–170° C.

The ester used as starting material is prepared according to the methods described in Example 24 for the preparation of cyanomethyl esters. Melting point=116–117° C. yield 68%.

*Example 26*

A solution of 1.75 grams of p-nitrobenzyloxycarbonyl-DL-leucine cyanomethyl ester in 10 cc. of ethyl acetate is treated with 1.03 grams of freshly distilled glycine ethyl ester and the whole allowed to stand for 2 hours at room temperature. The solution is thereupon washed with water, dried and evaporated under vacuum. The oily residue crystallizes on triturating with ether. The crystals thus obtained (1.54 grams=78%) melt at 90–91° C., the melting point cannot be raised by recrystallization from alcohol-ether. The peptide produced corresponds to the formula

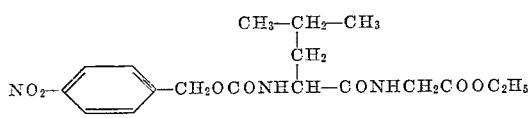

The ester used as starting material is prepared by the method described in Example 8. After recrystallization from ether-petroleum ether it melts at 64–65° C., yield 68%.

*Example 27*

2.23 grams of p-nitrobenzyloxycarbonyl-DL-leucine-p-nitrophenylmethyl ester and 1.07 grams of benzylamine are dissolved in 10 cc. of ethyl acetate and the solution is heated for 10 hours under reflux. The residue obtained on evaporation crystallizes on addition of ether. After recrystallization from acetone-ether, the p-nitrobenyloxy-carbonyl-DL-leucine benzylamide melts at 129–131° C. Yield 1.52 grams (=76%).

The ester used as starting material is obtained by esterification of p-nitrobenzylcarbonyl-DL-leucine with p-nitrobenzyl chloride by the method described in Example 8, in this case, however, longer heating (15 hours) being necessary, M.P.=71–73° C. after recrystallization from ether-petroleum ether. The yield amounts to 72%.

*Example 28*

1.03 grams of tosyl-DL-methionine cyanomethyl ester are reacted by the method described in Example 26 with 0.62 gram of glycine ethyl ester. The peptide formed of the formula

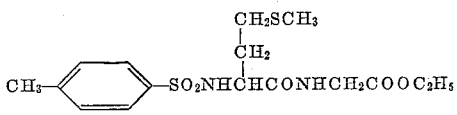

melts at 88–90° C. after recrystallization from alcohol-ether. Yield 1.0 gram (=86%).

The cyanomethyl ester used as starting material is prepared as follows:

3.03 grams of tosyl-DL-methionine are dissolved in 20 cc. of choloracetonitrile and the solution treated with 1.9 grams of triethylamine. The reaction mixture is heated for 5 hours to 50° C. and then evaporated under vacuum. The residue is taken up in ethyl acetate, filtered off from triethylamine hydrochloride and the filtrate is washed with sodium bicarbonate solution and water, dried and evaporated. The ester initially obtained as an oil, crystallizes on triturating with ether, the crystals thus obtained (2.75 grams=80%) melt at 80–81° C., the melting point is not raised by recrystallization from acetone-petroleum ether.

*Example 29*

A solution of 1.95 grams of tosyl-DL-methionine carbethoxymethyl ester and 1.21 grams of phenylethylamine in 10 cc. of ethyl acetate is allowed to stand for 5 hours at room temperature. The solution is then washed with 1 N-hydrochloric acid and water, dried and evaporated. The solid residue is triturated with ether and thus yields 1.71 grams (=84%) of a substance of M.P. 89–90° C. After further recrystallization from acetone-ether, the tosyl-DL-methionine phenylethylamide melts at 94–95° C.

The ester used as starting material is obtained by the method described in Example 28 by reaction of tosyl-DL-methionine with ethyl bromacetate, shorter heating (1 hour at 50° C.) being sufficient in this case. The ester thus obtained is purified by distillation, B.P. 203–206° C. (0.01 mm. pressure). The yield amounts to 69%.

If the ester is prepared by the method described in Example 8, the yield amounts to 62%.

*Example 30*

0.98 gram of dicarbobenzoxy-L-tyrosine cyanomethyl ester is dissolved in 5 cc. of ethyl acetate and treated with 0.43 gram of benzylamine. The solution is allowed to stand for 5 hours at room temperature and then evaporated under vacuum. The crystalline residue is washed with ether and thus yields 1.0 gram (=93%) of the formula

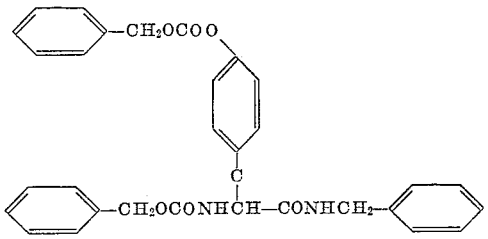

After recrystallization from acetone-ether, the substance melts at 187–189° C.

The same amide is obtained when dicarbobenzoxy-L-tyrosine carbethoxymethyl ester is reacted with benzylamine. By the application of the reaction conditions set forth above, the yield amounts to 75%.

The esters used as starting materials are prepared by the method described in Example 28 by reaction of dicarbobenzoxy-L-tyrosine and chloracetonitrile or ethyl bromacetate respectively.

Dicarbobenzoxy-L-tyrosine cyanomethyl ester, M.P. 79–80° C., yield 82%.

Dicarbozenoxy-L-tyrosine carbethoxymethyl ester, M.P.=98–100° C., yield 71%.

Example 31

A solution of 3.90 grams of dicarbobenzoxy-L-tyrosine cyanomethyl ester and 1.55 grams of glycine ethyl ester in 15 cc. of ethyl acetate is allowed to stand for 8 hours at room temperature. After about one hour the separation of crystals commences and these are filtered off after 8 hours. (2.35 grams). The filtrate is washed with N-hydrochloric acid and water, dried and evaporated. The residue, after trituration with ether, yields a further 1.65 grams of crystalline material, so that the total yield amounts to 4.0 grams (=94%). The dicarbobenxoxy-L-tyroxyl-glycine ethyl ester, after recrystallization from acetone-ether, melts at 164–165° C.

In a similar manner 0.98 gram of dicarbobenzoxy-L-tyrosine cyanomethyl ester may be reacted with an equimolecular quantity of DL-leucine ethyl ester (0.32 gram) in which case, however, a longer reaction time (40 hours at room temperature) is necessary. The dicarbobenzoxy-L-tyrosyl-DL-leucine ethyl ester, after recrystallization from acetone-ether, melts at 159–160° C. The yield amounts to 68%.

Example 32

0.55 gram of hippuric acid cyanomethyl ester (0.0025 mol) and 0.48 gram of L-isoleucine ester (0.003 mol) are dissolved in 1 cc. of ethyl acetate and allowed to stand for 24 hours at room temperature. After diluting with ethyl acetate, the solution is washed with 1 N-hydrochloric acid, 2N-sodium carbonate solution and water, dried and evaporated. The oily residue is distilled under 0.01 mm. of pressure, the main quantity (0.72 gram=90%) passing over at 195–200° C. Further distillation yields 0.62 gram (81%) of pure hippuryl-L-isoleucine ethyl ester boiling at 195–201° C. under 0.01 mm. of pressure.

Example 33

A solution of 0.54 gram of hippuric acid cyanomethyl ester (0.0025 mol) and 0.63 gram of L-tyrosine ethyl ester (0.003 mol) in 1 cc. of ethyl acetate is allowed to stand for 24 hours at room temperature and then worked up in the manner described in Example 32. The crude hippuryl-L-tyrosine ethyl ester obtained as oil (0.92 gram, about 90–100%) is agitated with an excess of 0.5 N-caustic soda solution at room temperature until the whole is dissolved. The saponification product is precipitated with dilute hydrochloric acid as oil, washed with water and triturated with ethyl acetate. In this manner there is obtained 0.6 gram (69%) of N-hippuryl-L-tyrosine which after recrystallization from acetone melts at 199–200° C.

Example 34

1.4 grams of O-benzoyl-L-tyrosine ethyl ester hydrochloride (0.004 mol) are suspended in 50 cc. of ether, cooled to 0° C. and agitated with 4 cc. of 1 N-caustic soda solution while cooling. The ethereal solution is dried, concentrated to a volume of about 3 cc. and mixed with a solution of 0.66 gram (0.003 mol) of hippuric acid cyanomethyl ester in 5 cc. of ethyl acetate. The mixture is allowed to stand for 60 hours at room temperature and then worked up in the manner described in Example 25. The crystalline residue is washed with ether and yields 1.42 grams (100%) of N-hippuryl-O-benzoyl-L-tyrosine ethyl ester melting at 147–148° C. after recrystallization from acetone.

The same compound is obtained in a yield of 65% when the hippuric acid dicarbethoxymethyl ester described in Example 13 is reacted with O-benzoyl-L-tyrosine ethyl ester.

Example 35

0.61 gram of carbobenzoxy-DL-leucine cyanomethyl ester (0.002 mol) and 0.27 gram of benzylamine (0.0025 mol) are dissolved in 3 cc. of ethyl acetate and allowed to stand for 5 hours at room temperature. The crystals of carbobenzoxy-DL-leucine-benzylamide formed during this time are filtered off and washed with ethyl acetate and ether, yield 0.63 gram (89%). After recrystallization from acetone the compound melts at 116–117° C.

The ester used as starting material can be prepared as follows:

A solution of 24 grams of carbobenzoxy-DL-leucine (0.09 mol), 10.1 grams of triethylamine (0.1 mol) and 15.1 grams of chloracetonitrile (.0.2 mol) in 100 cc. of ethyl acetate is heated for 3 hours under reflux. The triethylamine hydrochloride which separates off is then filtered, and the filtrate washed with dilute sodium carbonate solution and water, dried and freed from solvent in vacuo. The oily residue crystallizes after adding ether and yields 23.1 grams (83%) of carbobenzoxy-DL-leucine cyanomethyl ester which melts at 83–85° C. after recrystallization from a mixture of acetone and ether.

Example 36

1.52 grams of carbobenzoxy-DL-leucine cyanomethyl ester (0.005 mol) and 0.62 gram of glycine ethyl ester (0.006 mol) are dissolved in 10 cc. of ethyl acetate and allowed to stand for 5 hours at room temperature. The solution is then washed with dilute hydrochloric acid and water, dried and evaporated in vacuo. The resulting material is crystallized from petroleum ether at −10° C. and yields 1.31 grams (75%) of nearly pure carbobenzoxy-DL-leucyl-glycine ethyl ester. After recrystallization from a mixture of acetone and ether the peptide derivative melts at 85–86° C.

Example 37

A solution of 12.16 grams of carbobenzoxy-DL-leucine cyanomethyl ester (0.04 mol) and 3.33 grams of glycine amide (0.045 mol) in 120 cc. of acetonitrile is allowed to stand for 15 hours at room temperature. After filtering the crystals formed and concentrating the mother liquor, 11 grams (85%) of carbobenzoxy-DL-leucyl glycine amide melting at 135–138° C. are obtained. After recrystallization from a mixture of acetone and ether the compound melts at 138–139° C.

Example 38

0.435 gram of hippuric acid cyanomethyl ester (0.002 mol) and 0.412 gram of DL-leucyl-glycine amide (0.0022 mol) are dissolved in 3 cc. of acetonitrile and allowed to stand for 18 hours at room temperature. After removing the solvent in vacuo, the residue is taken up in ethyl acetate and the solution washed with dilute hydrochloric acid and water, dried and evaporated in vacuo. Crystallization of the residue from ethyl acetate yields 0.59 gram (85%) of pure hippuryl-DL-leucyl-glycine amide melting at 185–187° C.

The DL-leucyl glycine amide used as starting material can be prepared as follows:

(a) 4.82 grams of the carbobenzoxy-DL-leucyl glycine amide (0.015 mol) described in Examples 37 are dissolved in 38.4 cc. of 1.17 N-hydrobromic acid (0.045 mol) in dry glacial acetic acid and allowed to stand at room temperature until the evolution of carbon dioxide ceases (2½ hours). After removing the solvent in vacuo and washing the residue with ether and hot acetone there are obtained 3.22 grams (80%) of DL-leucyl-glycine amide hydrobromide which, after recrystallization from alcohol melts at 200–202° C. 0.81 of this hydrobromide (0.003 mol) is dissolved in 15 cc. of water, covered with a layer of 10 cc. of ethyl acetate, and agitated for a short time 0° C. with 1 cc. of caustic soda solution of 40 percent strength. The ethyl acetate solution is then separated off, the aqueous phase is extracted twice more with ethyl acetate and the combined ethyl acetate solutions dried and evaporated in vacuo, 0.43 gram (75%) of crystalline DL-leucyl-glycine amide melting at 97–98° C. being obtained.

(b) 0.34 gram of carbobenzoxy-DL-leucyl-glycine amide (0.001 mol) is dissolved in 10 cc. of absolute methanol and hydrogenated in the presence of 0.1 gram of palladium black. After 2 hours the solution is filtered off from the catalyst and evaporated in vacuo. On the addition of ether, from the oily residue 0.18 gram (91%) of crystals melting at 95–98° C. separate out which are identical with the DL-leucyl glycine amide prepared according to method a).

*Example 39*

0.61 gram of carbobenzoxyl-L-leucine cyanomethyl ester (0.002 mol) and 0.27 gram of benzylamine (0.0025 mol) are dissolved in 3 cc. of ethyl acetate and allowed to stand for 5 hours at room temperature. The solvent is then removed in vacuo and the oily residue crystallized from a mixture of ether and petroleum ether, yield=0.64 gram (90%). The carbobenzoxy-L-leucine-benzylamide melts after recrystallization from a mixture of acetone and ether at 101–102° C. $[\alpha]_D^{26} = 17°$ (c.=1.02 in chloroform).

The ester used as starting material is prepared in an analogous manner to that described in Example 35. Melting point 84–85° C. $[\alpha]_D^{23} = -27.3°$ (c.=5 in chloroform).

*Example 40*

12.16 grams of carbobenzoxy-L-leucine cyanomethyl ester (0.04 mol) and 4.96 grams of glycine ethyl ester (0.048 mol) are dissolved in 60 cc. of ethyl acetate and allowed to stand for 15 hours at room temperature. After being worked up in the manner described in Example 36 there are obtained 15.7 grams of a colorless oil from which after the addition of ether 8.7 grams (62%) of crystalline carbobenzoxy-L-leucyl-glycine ethyl ester melting at 102–103° C. are isolated, $[\alpha]_D^{23} = -26.6°$ (c.=5 in ethanol).

In order to test the optical purity a test portion of the substance is converted into L-leucyl-glycine by hydrolysis and decarboxylation. The rotation, $[\alpha]_D^{23} = +84.3°$ (c.=3.04 in water) found for this substance with melting point 240–243° C. is in good agreement with the value $[\alpha]_D^{24} = +85.8$ given in the literature.

*Example 41*

A solution of 0.41 gram of L-leucyl-glycine ethyl ester (0.0019 mol) and 0.33 gram of hippuric acid cyanomethyl ester (0.0015 mol) in 2 cc. of ethyl acetate is allowed to stand for 5 hours at room temperature. The hippuryl-L-leucyl-glycine ethyl ester which separates off is then filtered (0.34 gram, melting at 185–187° C.) and from the mother liquor a further quantity (0.18 gram melting at 184–185° C.) of the same substance is isolated after adding ether. Yield=0.52 gram (92%). The compound recrystallized from acetone melts at 185–187° C., it has an optical rotation of $[\alpha]_D^{25} = +32°$ (c.=0.79 in chloroform).

To test the optical purity 0.24 gram of the substance is hydrolysed by boiling with concentrated hydrochloric acid. After removing the benzoic acid by filtration and evaporation of the solution in vacuo, the L-leucine is isolated from the mixture of the amino acid hydrochlorides by treating the aqueous solution with naphthalene-β-sulfonic acid as L-leucine-naphthalene β-sulfonate melting at 187–188.5° C. Yield: 0.18 gram (80%). The specific rotation $[\alpha]_D^{25} = +9°$ (c.=0.98 in glacial acetic acid) corresponds to that of a product prepared from pure L-leucine.

The L-leucyl glycine ethyl ester used as starting material is prepared as follows:

3.5 grams of the carbobenzoxy-L-leucyl-glycine ethyl ester (0.01 mol) described in Example 40 are dissolved in 35 cc. of absolute methanol and hydrogenated in the presence of 0.5 gram of palladium on animal carbon (10% palladium) in a closed system, the carbon dioxide evolved being absorbed in a second vessel by means of dilute caustic soda solution. After 242 cc. of hydrogen (calculated 248 cc.) have been taken up within 25 minutes, hydrogenation is complete. The solution is then filtered off from the catalyst and evaporated under reduced pressure. The acetate of L-leucyl-glycine ester obtained as an oily residue is converted in known manner into its free base by treating the aqueous solution with potassium carbonate and extracting with ether, the base being used for the above described reaction without further purification.

*Example 42*

70 mg. of triglycine-cyanomethyl ester hydrochloride are dissolved in 1.5 ml. of dimethyl-formamide and treated with 1 drop of glacial acetic acid and 15 drops of triethylamine. After 5 minutes, an amorphous precipitate appears together with the crystals of triethylamine hydrochloride. After two hours, the latter is centrifuged and thoroughly washed with water. The yield amounts to 45 mg. of (polytriglycine)-cyanomethyl ester. The biuret test is positive.

*Example 43*

100 mg. of triglycine-cyanomethyl ester hydrochloride are dissolved in dimethyl-formamide and 3 drops of glacial acetic acid to produce a total volume of 4.0 ml. and the solution is slowly added dropwise (0.2 ml. in 15 minutes) to a mixture of 20 ml. of pyridine and 0.5 ml. of glacial acetic acid at 70° C. When the reaction is complete, the colorless, crystalline precipitate is filtered with suction, washed with pyridine, acetone and ether and recrystallized from water. The yield is 35 mg. (51%) of cyclo-hexaglycyl.

A similar attempt using triglycine-methyl ester hydrochloride with pyridine or with a pyridine-piperidine mixture gives no cyclohexaglycyl.

*Example 44*

390 mg. of the trifluoracetic acid salt of L-valyl-Nδ-tosyl-L-ornithyl-L-leucyl-D-phenylalanyl-L-prolyl-L-valyl-Nδ-tosyl-L-ornithyl-L-leucyl-D-phenylalanyl-L-proline p-nitrophenyl-ester are dissolved in 10 ml. of dimethyl-formamide together with 3 drops of glacial acetic acid, the solution introduced dropwise during 3 hours with stirring into 75 ml. of pyridine (at 95° C.) and the resulting faintly brownish solution maintained for a further hour at the said temperature. The solvent is evaporated under vacuum and the residue dried under high vacuum over concentrated sulfuric acid. The reaction product is extracted with boiling ether. The insoluble residue is dissolved in a mixture of isopropanol-methanol-water (1:1:1) and filtered through two columns of ion exchangers "Merck I" and "Merck III" (swelled with the same solvent). The liquid which runs through is treated at 45° C. with water and freed under vacuum from organic solvents. The powdery reaction product is filtered with suction and dried under high vacuum over caustic soda. 170 mg. are obtained of a practically colorless, ninhydrin-negative substance.

For further purification, the "neutral fractions" in benzene-chloroform (9:1) are adsorbed in a volume of 12 grams of aluminum oxide (Brockmann) and washed with the same solvent mixture. Elution is carried out with chloroform and ethyl acetate. The operation is repeated with 3 grams of aluminum oxide. The residue of the chloroform and ethyl acetate fractions is dried, whereupon it becomes relatively difficulty soluble in ethyl acetate. From 65% ethanol, 91.1 mg. are obtained of a colorless compound crystallizing in long rods. The melting point after recrystallization several times from 65% ethanol is 319–320° C. with decomposition (brown coloration above 305° C., sintering at 316° C.). This product is cyclo-L-valyl-Nδ-tosyl-L-ornithyl-L-leucyl-D- phenylalanyl - L - prolyl-L-valyl-Nδ-tosyl-L-ornithyl-L-leucyl-D-phenylalanyl-L-proline in the form of its dihydrate. It is further characterized by its infra-red absorption spectrum which has bands at 3.08; 3.28; 6.53; 6.68; 7.54; 7.76; 7.97; 8.10; 8.43; 8.69; 9.17; 12.26 and 14.25μ.

It can be converted as follows into the antibiotic Gramicidin S:

60 mg. of this dihydrate are dissolved in 20 ml. of liquid ammonia and treated with 100 mg. of sodium in small pieces. After complete dissolution of the sodium the solution remains clear. After the addition of a little ammonium chloride, the ammonia is evaporated and the residue freed under high vacuum from mercaptan produced. The reaction product is taken up with absolute ethanol to which a few drops of a solution of hydrochloric acid in ethyl acetate are added. After filtration, the solvent is evaporated. The residue is dissolved in a few drops of 65% ethanol and treated with water at 50° C. until a distinct turbidity is produced. Thereupon the dihydrochloride of the antibiotic Gramicidin S crystallizes in the form of fine needles. The melting point is 268–270° C. with decomposition, the melting point tube being introduced into a medium already at 250° C. A test for chlorine ions after boiling with 2 N-nitric acid is positive, $[\alpha]_D = -295°$ (70° ethanol). Gramicidin S is cyclo - L - valyl-L-ornithyl-L-leucyl-D-phenylalanyl-L-prolyl - L - valyl-L-ornithyl-L-leucyl-D-phenylalanyl-L-proline.

The trifluoracetic acid salt of L-valyl-Nδ-tosyl-L-ornithyl - L - leucyl-D-phenylalanyl-L-prolyl-L-valyl-Nδ-tosyl - L - ornithyl-L-leucyl-D-phenylalanyl-L-proline p-nitrophenyl ester, used as starting material, can be obtained as follows:

100 mg. of L-valyl-Nδ-tosyl-L-ornithyl-L - leucyl - D-phenylalanyl-L-proline methylester hydrochloride are dissolved in 1.5 ml. of chloroform, treated with 100 mg. of triphenyl-chloromethane and 5 drops of triethylamine and the whole maintained for 10 hours at room temperature. The solvent is then removed under vacuum and the residue freed from excess of chloride and carbinol by grinding with a mixture of petroleum ether and ether (1:1). The solid residue is dissolved in ethyl acetate and washed with tartaric acid solution and water. The dried solution, after evaporation, leaves 122 mg. (98%) of an almost colorless, glassy residue. By reprecipitation from benzene by means of petroleum ether, the trityl-L-valyl-Nδ-tosyl-L-ornithyl-L-leucyl-D-phenylalanyl-L-proline methylester is obtained as a solid, microcrystalline compound of melting point 123.5–125.5° C. In trifluoracetic acid, the characteristic yellow color for trityl compounds is produced. For analysis, the compound is dried for 2 hours at 90° C. under $10^{-3}$ mm. of mercury:

$C_{57}H_{70}O_8NS$ (999.3), calculated N, 8.41; S, 3.21. Found N, 8.35; S, 2.96%.

This compound has the formula of water and 0.5 ml. of methanol, the clear solution is heated to 37° C. for hydrolysis. From time to time, 3 drops of this solution are diluted with water. After 45 minutes no further turbidity takes place. The batch is poured into 200 ml. of water at 5° C. and acidified with about 2 ml. of acetic acid (2 N). After 1 hour at 5° C., the free acid is filtered with suction, washed with water and dried: 110 mg. (56%). Extraction of the mother liquor with ethyl acetate followed by customary working up gives a further 70 mg. (35%). Hydrolysis of a test portion with trifluoracetic acid and chromatography on Whatman No. 1 paper with n-butanol-glacial acetic acid-water (4:1:1) gives a spot, ninhydrin-positive with $R_f=0.90$. Zeisel determinations give at the most traces of methoxyl. 580 mg. of the resulting free acid are dissolved together with 475 mg. of L-valyl-Nδ-tosyl-L-ornithyl-L-leucyl-D-phenylalanyl-L-proline methyl ester and 155 mg. of cyclohexyl-(morpholinyl-ethyl)-carbodiimide in ethyl acetate and the solution maintained for 5 hours at room temperature. The batch is then diluted with ethyl acetate and washed at 0° C. with N-hydrochloric acid, dilute ammonia, water and saturated common salt solution. The dride solution leaves on evaporation and drying under high vacuum 1.04 grams (100%) of a colorless glass which slowly crystallizes. Reprecipitation from benzene-petroleum ether and drying at 80° C. under 0.001 mm. pressure gives trityl-L-valyl-Nδ-tosyl-L-ornithyl-L-leucyl-D-phenylalanyl-L-prolyl-L-valyl-Nδ-tosyl-L - ornithyl - L-leucyl-D-phenylalanyl-L-proline methyl ester of melting point 106–107° C.

For hydrolysis, 1 gram of this methyl ester in 30 ml. of dioxane is treated with 11 ml. of 0.5 N-caustic soda solution and 5 ml. of methanol in the manner described above for the hydrolysis of the trityl-pentapeptide methyl ester and worked up. The hydrolysis is practically complete after ½ hour. By precipitation of the solution diluted with 900 ml. of cold water, with about 10 ml. of 2 N-acetic acid, 600 mg. of colorless, solid substance are obtained. The resulting free acid melts at 133–134° C. and contains only residual traces of methoxyl groups.

540 mg. of this free acid and 500 mg. of di-(p-nitrophenyl)-sulfite are dissolved in 5 ml. of pyridine and kept for 5 hours at room temperature. The pyridine is then evaporated under vacuum and the residue taken up in ethyl acetate and washed with tartaric acid solution and water. After evaporation of the ethyl acetate, excess of nitrophenol is removed with a mixture of ether-petroleum ether (1:1). After this treatment, the colorless, solid residue no longer becomes yellow on introduction into dilute ammonia (neither free nitrophenol nor di-(p-nitrophenyl)-sulfite is present). The purity of the resulting nitrophenyl ester of trityl-L-valyl-Nδ-tosyl-L-ornithyl-L-leucyl-D-phenylalanyl-L-prolyl-L-valyl-Nδ-tosyl-L - ornithyl-L-leucyl-D-phenylalanyl-L-proline was spectrascopically determined by means of a solution in 0.5 N-aqueous

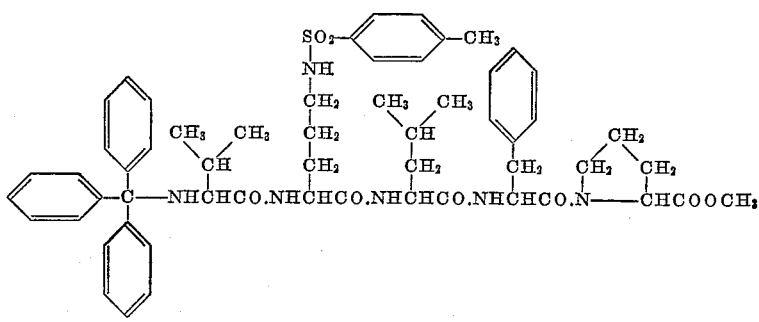

200 mg. of the above methyl ester are dissolved in 7.5 ml. of dioxane and freed from a slight turbidity by filtration through Celite (diatomaceous earth). After addition of a mixture of 1.5 ml. of N-caustic soda solution, 1.5 ml.

alcoholic caustic soda solution (1:1; v.:v.) and found to be 92%.

For splitting off the trityl residue, 500 mg. of the nitrophenyl ester are dissolved in 10 ml. of trifluoracetic acid and the solution, with cooling to −5° C., treated with 2 ml. of water in small portions. The solution is kept for 15 minutes at room temperature, as a result of which much triphenylcarbinol separates. The solvent is then evaporated under $10^{-2}$ mm. pressure using a receiver cooled to −80° C. (bath temperature 30° C.). The residue is thoroughly washed with ether and then dried under a pressure of $10^{-3}$ mm. It constitutes the trifluoracetic acid salt of the p-nitrophenyl ester of L-valyl-Nδ-tosyl-L-ornithyl-L-leucyl-D-phenylalanyl-L-prolyl-L - valyl - Nδ-tosyl-L-ornithyl-L-leucyl-D-phenylalanyl-L-proline.

*Example 45*

420 mg. of glycyl-DL-phenylalanyl-glycine-cyanomethyl ester hydrochloride are dissolved in 10 cc. of dimethyl formamide, 5 drops of glacial acetic acid are admixed, and the whole is added dropwise at 95° C. in the course of 5 hours to 100 cc. of pyridine and 2.5 cc of glacial acetic acid. The mixture is then stirred for 2½ hours at 95° C. After that the mixture is evaporated to complete dryness in vacuo, the residue dissolved while hot in 100 cc. of a 1:1 mixture of methanol and water, the solution filtered through a column of strongly acid ion-exchanger "Merck" and a column of strongly basic ion-exchanger "Merck," and washed well with a 1:1 mixture of methanol and water. The filtrate is evaporated to dryness, the residue triturated with acetone, and the precipitate filters with suction. There are obtained 70 mg. of cyclo-glycyl-DL-phenylalanyl-glycyl. The product can be recrystallized from a large quantity of methanol-water. It crystallizes in the form of white platelets. At 300° C. they turn brown and at 312° C. they melt with decomposition. The yield is 70 mg. or 20 percent of the calculated quantity.

*Example 46*

400 mg. of the glycyl-DL-phenylalanyl-glycine-p-nitrophenyl ester hydrobromide, dissolved in 8.5 cc. of dimethyl formamide and 4 drops of glacial acetic acid, are added dropwise in the course of 5 hours at 95° C. to 85 cc. of pyridine and 2 cc. of glacial acetic acid. Working up is carried out as described in Example 4. There are obtained 63 mg. of cyclo-glycyl-DL-phenylalanyl-glycyl, that is to say, a yield of 29 percent.

When the above reaction is carried out at a temperature of 55° C. the same product is obtained in a yield of 38 percent.

*Example 47*

425 mg. of the glycyl-DL-phenylalanyl-glycine-p-methanesulfonyl-phenyl ester hydrochloride, dissolved in 8 cc. of dimethyl formamide and 4 drops of glacial acetic acid, are added dropwise in the course of 5 hours at 95° C. to 85 cc. of pyridine and 2 cc. of glacial acetic acid. Working up is carried out as described in the preceding examples. There is obtained a 45 percent yield, that is to say, 107 mg. of cyclo-glycyl-DL-phenylalanyl-glycyl.

When the above-mentioned hydrochloride is added to the pyridine at 55° C. the yield is only 30 percent.

*Example 48*

410 mg. of the glycyl-glycyl-DL-phenylalanine-p-methanesulfonyl-phenyl ester hydrochloride, dissolved in 8 cc. of dimethyl formamide and 4 drops of glacial acetic acid, are added dropwise at 95° C. to 80 cc. of pyridine and 2 cc. of glacial acetic acid. On working up in the usual manner there are obtained 57 mg. of cyclo-glycyl-glycyl-DL-phenylalanine. The yield is 25 percent.

*Example 49*

105 mg. of glycyl-glycyl-DL-phenylalanine-p-methanesulfonyl-phenyl ester hydrochloride are dissolved in 0.1 cc. of dimethyl formamide, 6 drops of triethylamine are added, and the whole is cooled immediately. Triethylamine hydrochloride is precipitated soon. The mixture is allowed to stand at room temperature for 3 days, then heated to 70° C. for 1 hour. The dimethylformamide is evaporated under reduced pressure and the residue triturated with water. 35.8 mg. of difficultly soluble product are obtained. At 230° C. this product sinters, on further heating it turns slowly black, and at 268° C. it decomposes. It is insoluble in 1 N-HCl or 1 N-NaOH, very difficultly soluble in boiling methanol or water or in a mixture of these two solvents. From its trifluoracetic acid solution the product precipitates in amorphous state upon the addition of water, unlike the cyclic tripeptide which crystallizes in the form of minute needle clusters. 16.3 mg. of the crude product are dissolved hot in a large quantity of a 1:1:1 mixture of dimethyl formamide, methanol and water and filtered through a column of strongly acid ion-exchanger "Merck" and through one of strongly basic ion-exchanger "Merck." The filtrate is evaporated to dryness in vacuo. There remain 9.8 mg. of a product which from the trifluoroacetic acid solution upon the addition of water precipitates in the amorphous state.

The starting materials of Examples 42, 43 and 45–49 can be prepared by splitting off either (a) The trityl group from the corresponding N-trityl-peptide ester with trifluor acetic acid as specified in Example 44; or (b) The trityl group from the corresponding N-trityl-peptide ester with a solution of an inorganic acid. For example 5.07 g. of trityl-triglycin-cyano methylester are dissolved in 30 cc. of boiling acetonitrile and treated with 28 cc. of 1.2-n HCl in ethyl acetate. Immediately, 2.75 g. of pure triglycyl-cyano methylester hydrochloride separate in crystalline form; melting point 159–160° C.; or (c) The carbobenzoxy group from the corresponding N-carbobenzoxy peptide ester with a solution of a strong acid. For example, 500 mg. of N-carbobenzoxy glycyl-DL-phenylalanyl-glycine p-nitrophenyl ester are dissolved in 2 cc. of glacial acetic acid-hydrobromic acid (2-n). After standing for one hour at room temperature, the solution is evaporated in vacuo and the residue treated with ether to remove benzyl-bromide. The remaining glycyl-DL-phenylalanyl-glycine-p-nitrophenyl ester is used as such for condensations; or (d) The carbobenzoxy group from the corresponding N-carbobenzoxy peptide ester by catalytic hydrogenation. For example, 560 mg. of N-carbobenzoxy glycyl-DL-phenylalanyl-glycine p-methanesulfo phenyl ester are dissolved in 50 cc. of methanol, 1 cc. of 1-n HCl and 50 mg. of 5% palladium on charcoal added. The mixture is hydrogenated at room temperature. The hydrogen uptake comes to a stand-still after 40 minutes. After filtration, the solvents are evaporated in vacuo, leaving 460 mg. of crystalline glycyl-DL-phenylalanyl-glycine-p-methanesulfo phenyl ester. The crystallization is carried out from ethanol ester solution.

The trityl and carbobenzoxy compounds described above may be prepared according to processes described in U.S. patent application, Serial No. 485,818, filed February 2, 1955, and now abandoned, by Robert Schwyzer et al.

*Example 50*

710 mg. of ε-amino-n-caproic acid-paramethanesulfonyl-phenyl ester hydrochloride are dissolved in 14 cc. of dimethyl formamide containing 8 drops of glacial acetic acid and the solution added dropwise at 95° C. in the course of 4¾ hours, while stirring, into 140 cc. of pyridine and 4 cc. of glacial acetic acid. Stirring is then continued for 3 hours at the same temperature, the pyridine evaporated under reduced pressure, the residue dissolved in water and the solution filtered through a strongly acid ion exchanger and then through a strongly basic ion exchanger. The filtrate is evaporated to dryness in vacuo, and the residue distilled under reduced pressure. The distilled caprolactam is dissolved in ether and the solution poured over a column of $Al_2O_3$ and the ε-n-caprolactam eluated with ethyl acetate and a 1:1 mixture of ethyl acetate and methanol. On inoculation, the product crystallizes instantly.

The compound used as starting material can be prepared as follows:

(1) *Carbobenzoxy-ε-amino-n-caproic acid.* — 10.37 grams of amino-caproic acid are dissolved in 1 mol of 1 N-sodium hydroxide solution and mixed with 1.5 mol of carbobenzoxy chloride in ether and simultaneously with 2 mols of 4 N-sodium hydroxide solution, while being cooled with ice and stirred well. Stirring is continued for 1 hour at room temperature, the alkaline solution then extracted with ether, and acidified while being cooled with ice. The ε-carbobenzoxyamino-n-caproic acid precipitates in the form of an oil which soon solidifies. The product is filtered with suction, washed and dried. The yield is 20 grams or 95 percent of the theoretical yield.

For analysis the product is recrystallized from carbon tetrachloride and then forms fine white needles of melting point 54–55° C.

(2) *Carbobenzoxy-ε-amino-n-caproic acid-para-methane-sulfonyl-phenyl ester.*—1.7 grams of carbobenzoxyamino-caproic acid in 10 cc. of pyridine are mixed with 3.35 grams of di-(p-methanesulfonylphenyl)-sulfite and allowed to stand at room temperature for 17 hours. The greater part of the pyridine is then expelled under reduced pressure, the residue dissolved in benzene, and the solution extracted by shaking with 2 N-hydrochloric acid, ice-cold soda solution, and water. After drying, and evaporation of the benzene, the residue is crystallized from methanol containing some water. The yield is 99 percent of the calculated yield. The compound forms white needles of melting point 83.5–84° C.

(3) *ε-Amino-n-caproic acid-para-methanesulfonylphenyl ester hydrochloride.*—2.48 grams of the above compound are dissolved in 50 cc. of methanol and 6.5 cc. of 1 N-hydrochloric acid and hydrogenated with the addition of 300 mg. of 10% palladium charcoal, the $CO_2$ formed being at the same time absorbed in sodium hydroxide solution. The hydrogen uptake is 148 cc. The catalyst is filtered off with suction, the filtrate evaporated to dryness and the residue recrystallized from absolute ethanol. The product melts at 157–158° C.

What is claimed is:

1. In a method for preparing carboxylic acid amides by reacting in a solution an amino compound in which the amino group is the sole group acylatable by a carboxylic acid ester, and having at least one free hydrogen atom attached to the amino nitrogen with an ester the improvement in which the ester is a methyl ester of a carboxylic acid having the alcoholic radical $$-O-CH\begin{matrix}R_1\\R_2\end{matrix}$$

each of $R_1$ and $R_2$ being members of the group consisting of —H, —C≡N, $$-\underset{\underset{=O}{|}}{C}\text{—O lower alkyl}, \quad -\underset{\underset{=O}{|}}{C}\text{—NH}_2, \quad -\underset{\underset{=O}{|}}{C}\text{—CH}_3$$

and $$C_6H_4-N\diagup\!\!\!\!\diagdown\begin{matrix}O\\O\end{matrix}$$

at least one of the substituents $R_1$ and $R_2$ being a substituent as defined above.

2. A process of claim 1 wherein, in the ester reactant, $R_1$ is hydrogen and $R_2$ is —C≡N.

3. A process of claim 1 where, in the ester reactant, $R_1$ and $R_2$ are $$-\underset{\underset{=O}{|}}{C}\text{—O lower alkyl}$$

4. A process of claim 1 wherein, in the ester reactant, $R_1$ is hydrogen and $R_2$ is $$-\underset{\underset{=O}{|}}{C}\text{—NH}_2$$

5. A process of claim 1 wherein, in the ester reactant, $R_1$ is hydrogen and $R_2$ is $$-\underset{\underset{=O}{|}}{C}\text{—CH}_3$$

other than hydrogen.

6. An improved method as set forth in claim 1, wherein an ester of an a-amino carboxylic acid is used.

7. An improved method as set forth in claim 6, wherein the amino carboxylic acid ester starting material is employed in the form of a salt and the reaction is carried out in the presence of a basic agent selected from the group consisting of alkali group hydroxides, carbonates and bicarbonates, alkaline earth hydroxides and bicarbonates, and tertiary organic bases.

References Cited in the file of this patent

UNITED STATES PATENTS

| | | |
|---|---|---|
| 2,070,991 | Hund et al. | Feb. 16, 1937 |
| 2,713,574 | Vaughan | July 19, 1954 |

FOREIGN PATENTS

| | | |
|---|---|---|
| 653,452 | Great Britain | May 16, 1951 |

OTHER REFERENCES

Schwyzer: Helv. Chim. Acta, vol. 38, pp. 69–79 (1955).
Schwyzer: Helv. Chim. Acta, vol. 37, pp. 647–9 (1954).
Bartow et al.: Kansas University Quarterly, vol. X, No. 3, 260/561 Series A, July 1901, pp. 79–85. (Available in Dept. of Agr., Washington D.C.)
Anson et al.: Advances in Protein Chemistry, Academic Press, Inc., N.Y., vol. 5 (1949), pp. 6, 7.[1]
Melnikov et al.: Chem. Abs., vol. 72 (1933), p. 964.[1]
Degering: Organic Nitrogen Compounds (1945), p. 399.[1]
Wagner et al.: Synthetic Organic Chemistry, John Wiley and Lens, Inc., New York (1953), p. 567.[1]

[1] Copies in library.

UNITED STATES PATENT OFFICE
CERTIFICATE OF CORRECTION

Patent No. 3,035,041                         May 15, 1962

Robert Schwyzer et al.

It is hereby certified that error appears in the above numbered patent requiring correction and that the said Letters Patent should read as corrected below.

Column 4, line 18, for "particular" read -- particularly --; column 6, line 12, for "salicyclic" read -- salicylic --; column 14, lines 57 to 67, the formula should appear as shown below instead of as in the patent:

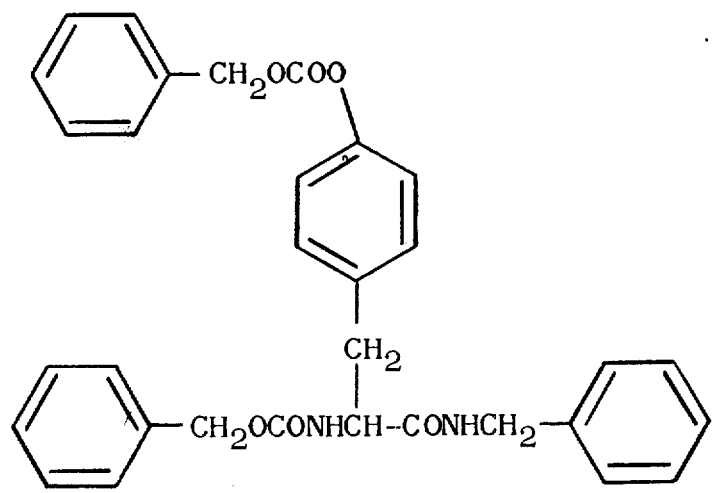

column 24, line 12, after "above" insert -- other than hydrogen --; line 15, for "where" read -- wherein --; line 29, strike out "other than hydrogen."; same column 24, line 30, for "a-amino" read -- α-amino --.

Signed and sealed this 12th day of May 1964.

(SEAL)
Attest:

ERNEST W. SWIDER                        EDWARD J. BRENNER
Attesting Officer                        Commissioner of Patents